United States Patent

Chen et al.

Patent Number: 5,586,205
Date of Patent: Dec. 17, 1996

[54] APPARATUS FOR SELECTING WAVEGUIDE MODES IN OPTICAL FIBER AND THE METHOD OF MANUFACTURING THE SAME

[75] Inventors: Tien-Jung Chen, Taipei; Shu-Hsia Chen, Hsinchu, both of Taiwan

[73] Assignee: National Science Council, Taiwan

[21] Appl. No.: 419,603

[22] Filed: Apr. 10, 1995

[51] Int. Cl.⁶ .................. G02B 6/26; G02F 1/13
[52] U.S. Cl. .................. 385/29; 385/27; 385/28; 385/11; 385/39; 385/43; 385/51; 349/1
[58] Field of Search .................. 385/11, 14, 15, 385/27, 28, 29, 39, 50, 51, 40, 43; 359/36, 63, 64, 65, 42

[56] References Cited

U.S. PATENT DOCUMENTS

| | | | |
|---|---|---|---|
| 3,777,149 | 12/1973 | Marcatili | 385/29 X |
| 3,891,302 | 6/1975 | Dabby et al. | 385/28 X |
| 4,386,822 | 6/1983 | Bergh | 385/11 X |
| 4,695,123 | 9/1987 | Chang et al. | 385/11 X |
| 4,721,352 | 1/1988 | Sorin et al. | 385/11 X |
| 4,753,497 | 6/1988 | Fuji et al. | 385/11 X |
| 4,763,972 | 8/1988 | Papuchon et al. | 385/11 X |
| 4,942,623 | 7/1990 | Asawa et al. | 385/130 X |
| 5,071,212 | 12/1991 | Mesaki et al. | 385/11 |
| 5,265,178 | 11/1993 | Braun et al. | 385/24 |
| 5,408,555 | 4/1995 | Fielding et al. | 385/43 |

OTHER PUBLICATIONS

"Optics Letter" vol. 11, No. 6, pp. 386–388, Jun. 1986.
"Optics Letter" vol. 8, No. 2, pp. 124–126, Feb. 1983.
"Optics Letter" vol. 11, No. 3, pp. 180–182, Mar. 1986.
"Electronics Letters" vol. 16, No. 20, pp. 762–764, Sep. 1980.

*Primary Examiner*—Brian Healy
*Attorney, Agent, or Firm*—Birch, Stewart, Kolasch & Birch, LLP

[57] ABSTRACT

An apparatus for selecting waveguide modes in optical fibers is disclosed, which comprises an optical fiber having of a core and a cladding sheathing the core. The optical fiber has a selected portion of the cladding removed and forms a recessed space in the cladding while preserving a predetermined thickness of the cladding remaining covering the core. The optical fiber is selected for allowing the transmission of light having multiple waveguide modes with radial and azimuthal electric field components. The apparatus further comprises a birefringent material filled in the recessed space. The birefringent material has the first and second refractive indices and the first refractive index is larger than the core index of the optical fiber, while the second refractive index is smaller than the cladding index of the optical fiber. The first and second refractive indices of the birefringent material are arranged in the radial and azimuthal directions of the optical fiber respectively, so that the transmitted light of the waveguide mode with the radial electric field component is coupled out from the core of the optical fiber to the selective portion of the cladding, and the transmitted light of the waveguide mode with only the azimuthal electric field component remains transmitted through the optical fiber.

25 Claims, 3 Drawing Sheets

APPARATUS FOR SELECTING WAVEGUIDE MODES IN OPTICAL FIBER AND THE METHOD OF MANUFACTURING THE SAME

BACKGROUND OF THE INVENTION

1. Field of the Invention

The present invention relates in general to the selection of waveguide modes in optical fibers. In particular, the present invention relates to an apparatus for selection of waveguide modes for light transmitted in an optical fiber and its corresponding method of fabrication.

2. Technical Background

The distinctive anisotropic characteristics of liquid crystals makes it an interesting material for exploitation in a wide range of applications. Studies exploring the use of liquid crystal materials in the making of optical fibers for various light-transmitting characteristics have been conducted. Liquid-crystal-clad tapered fibers, directional couplers with liquid crystal sandwiched between two side-polished fibers, coaxial fiber couplers embedded in liquid crystal, and optical fibers with liquid crystal core, are among the many subjects explored.

The control of polarization, or transmission mode, of light transmitted along an optical fiber is of potential importance in applications such as interferometric fiber sensors, as well as coherent light communication systems. Conventional means of polarization control is to emit light transmitted in an optical fiber and then pass it through a series of conventional bulk polarizers. After that, the light beam is redirected back into the optical fiber. Obvious disadvantages of the prior art means are that there are excessive insertion loss and difficulties in light re-alignment, as well as poor mechanical stability. To overcome these disadvantages, fiber-type polarizers directly compatible with fiber-optic transmission system are developed.

FIGS. 1a and 1b, for example, in the drawings accompanying the present invention show respectively the side view and cross-sectional view of the structural configuration of a typical prior art fiber-optic polarizer. A portion of the optical fiber 1 in the region near to the core 2 thereof, a portion of the cladding 3, is removed and replaced by birefringent materials such as potassium pentaborate ($KB_5O_8 \cdot 4H_2O$) crystal 4, which provides for the leaky loss when light is transmitted through the fiber.

FIG. 2 in the accompanying drawings is a side view showing the structural configuration of another prior art fiber-optic polarizer. A portion of the cladding 12 of an optical fiber is removed to expose the core, which also has a portion of its surface removed. A thin metal film 14 is then formed on the exposed surface of the core 16 to produce a metal-clad fiber-optic polarizer. The metal film provides radiative loss of light transmitted through the fiber. Light transmission having pseudo $TE_0$ and pseudo $TM_0$ mode components, as indicated by reference character M in FIG. 2, is polarized by this polarizer, with its pseudo $TE_0$ mode component leaking out and the pseudo $TM_0$ mode component remaining transmitted through the optical fiber, as indicated by N in the drawing. This is because the pseudo $TE_0$ mode component does not conform to the cutoff condition of the metal-clad fiber-optic polarizer, which forms a cutoff polarizer with high extinction ratio.

The prior art polarizers, illustrated in FIGS. 1 and 2 and described above, manipulate the control of polarization over the $HE_{11}$ modes in the fiber-optic waveguide. The resulting polarized light therefore is unidirectionally distributed in space and no polarization of azimuthal direction can be achieved. In polarization-dependent fiber-optic systems, polarization of the transmitted light in the azimuthal direction is potentially important, because of the characteristics of spatially circular symmetry in optical polarization direction and intensity distribution. In general, transmission of azimuthally polarized light can be obtained by selectively extracting the $TE_{01}$ mode of the light in the fiber-optic waveguide. However, because the propagation constants, as well as the cutoff conditions in the normalized frequency, of the $TE_{01}$, $TM_{01}$ and $HE_{21}$ modes of light transmitted over the conventional multimode optical fibers are similar, it is difficult to separate these modes. Without any practical means for extracting out the $TE_{01}$ mode in existing state-of-the-art techniques, light polarization in the azimuthal direction can not be achieved.

The current in-line polarizers, mentioned previously, attempt to maintain the polarization of processed light in the defined directions by producing differential transmission loss between the mutually orthogonal polarization modes, namely the pseudo $TE_0$ and the pseudo $TM_0$ modes of the transmitted light, to provide for the selection of one. For example, J. R. Feth et al. disclosed a thin-film metal-clad fiber-optic cutoff polarizer and its corresponding method of fabrication in an article entitled "Metal-clad fiber-optic cutoff polarizer", published in *Optics Letters*, Vol. 11, No. 6, June 1986, pp. 386–388. Feth et al. achieved an extinction ratio of 47 dB with insertion loss of 1 dB in their polarizer. In another article entitled "Single-mode-fiber evanescent polarizer/amplitude modulator using liquid crystals", published in *Optics Letters*, Vol. 11, No. 3, March 1986, pp. 180–182, K. Liu et al. disclosed an in-line polarizer utilizing the birefringent properties of a nematic liquid crystal placed in the evanescent field of a single-mode fiber. Amplitude modulation was also shown using an external electric field to reorient the liquid crystal molecules. A polarization-extinction ratio of 45 db with an insertion loss of 1 db was achieved by Liu et al. T. Hosaka et al. in still another article entitled "Fabrication of single-mode fiber-type polarizer", published in *Optics Letters*, Vol. 8, No. 2, February 1983, pp. 124–126, proposed a polarizer formed from a single-mode fiber composed of a concentric core and a silica cladding with a $B_2O_3$-doped silica portion. The cladding was asymmetrically etched off with 49% HF by taking advantage of differential etching rates of pure silica and $B_2O_3$-doped silica. An Al film was subsequently deposited on the area where the cladding had been etched away. In their polarizer, Hosaka et al. showed a maximum polarizing extinction ratio of 37 dB at wavelength=1.29 µm for a 4-cm polarizer. In still another study, W. Eickhoff disclosed a polarizer formed by grinding off the cladding on one side of a single-mode fiber and depositing metal onto the polished surface in the article "In-line fibre-optic polariser", published in *Electronics Letters*, Vol. 16, No. 20, September 1980, pp. 762–764, achieving an extinction ratio of 14 dB between orthogonal polarizations.

On the other hand, C. K. Asawa et al. showed techniques for coupling light of different modes or modal groups into or out of a multimode optical fiber, in U.S. Pat. No. 4,942,623, issued Jul. 17, 1990 entitled "Device and method for modal separation and combination in an optical fiber intrusion detection system". Moreover, in U.S. Pat. No. 3,891,302, issued Jun. 24, 1975 entitled "Method of filtering modes in optical waveguides", F. W. Dabby et al. showed planar waveguide filters and fiber-optic filters for filtering modes in an optical waveguide by selecting and providing a periodic variation such as surface corrugation or refractive index variation in a filter region in the waveguide. However, among all these disclosures, none reports the use of liquid crystals with radial molecular orientation and cylindrical symmetry in fiber cladding, to achieve mode selection or polarization control.

SUMMARY OF THE INVENTION

It is therefore an objective of the present invention to provide an apparatus and its method of fabrication for selecting waveguide modes in optical fiber, more specifically, selecting polarization modes either in the azimuthal direction of the optical fiber or in the radial direction.

The present invention achieves the above-indicated objectives by providing an apparatus for selecting waveguide modes in optical fibers. This apparatus comprises an optical fiber having of a core and a cladding sheathing the core. The optical fiber has a selected portion of the cladding removed and forms a recessed space such as a recessed ring-shaped space in the cladding while preserving a predetermined thickness of the cladding at the selected portion remaining covering the core. The optical fiber is selected for allowing the transmission of light having multiple waveguide modes with radial and azimuthal electric field components. The apparatus further comprises a birefringent material filled in the recessed ring-shaped space. The birefringent material has the first and second refractive indices and the first refractive index is larger than the refractive index of the core of the optical fiber, while the second refractive index is smaller than the refractive index of the cladding of the optical fiber. In one scheme, the first and second refractive indices of the birefringent material are arranged in the radial and azimuthal directions of the optical fiber, respectively. When a light beam is transmitted through the apparatus, the waveguide modes with the radial electric field component are coupled out of the core of the optical fiber in the cladding-removed section of the fiber, and the waveguide mode with only the azimuthal electric field component remains transmitted through the optical fiber. In the other scheme, the first and second refractive indices of the birefringent material are arranged in the azimuthal and radial directions of the optical fiber respectively, and the waveguide modes with only the radial electric field component will then remain transmitted through the fiber.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objectives, features and advantages of the present invention will become apparent by way of the following detailed descriptions of the preferred but non-limiting embodiments. The description is made with reference to the accompanying drawings which are given by way of illustration only, and thus are not limitative of the present invention, and wherein.

DETAILED DESCRIPTIONS OF THE PREFERRED EMBODIMENTS

Conventional methods of characterizing optical fibers employ a cylindrical coordinate system for property description. This allows expression of phenomena in radial (r), azimuthal (ø), and axial (z) terms. Thus light is expressed and described according to electric and magnetic field intensities in two sets of cylindrical coordinate components, namely $E_r$, $E_\phi$, $E_z$ and $H_r$, $H_\phi$, $H_z$. Light transmission in an optical fiber with no axial z component in its electric field intensity, that is, light transmissions in which $E_z=0$ are categorized as TE mode transmissions. Light transmissions with no $H_z$ are categorized as TM mode transmissions. Light transmissions with non-zero $E_z$ and $H_z$ components are categorized as mixed modes and termed HE or EH modes.

Figure 1A:
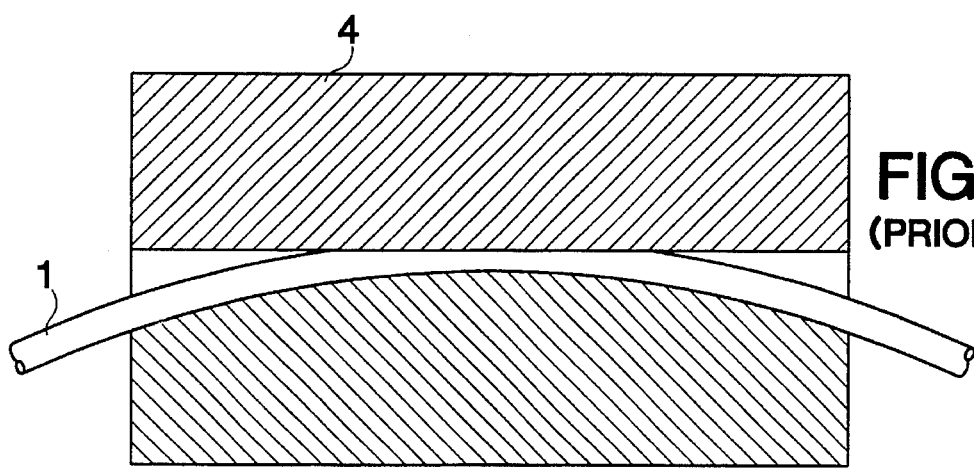
FIGS. 1a and 1b show respectively the side view and cross-sectional view of the structural configuration of a prior art fiber-optic polarizer.
Figure 1B:
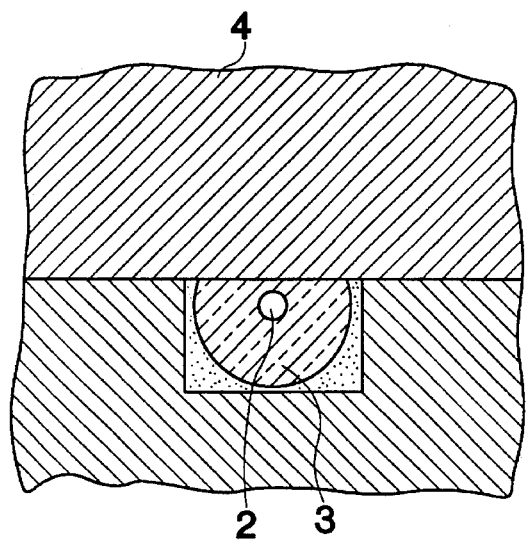
Figure 2:
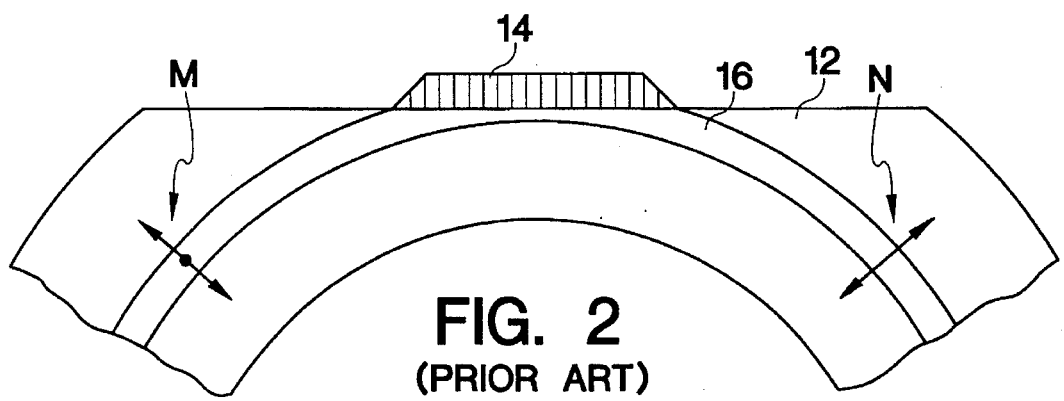
FIG. 2 shows the side view of the structural configuration of another prior art fiber-optic polarizer.
Figure 3A:
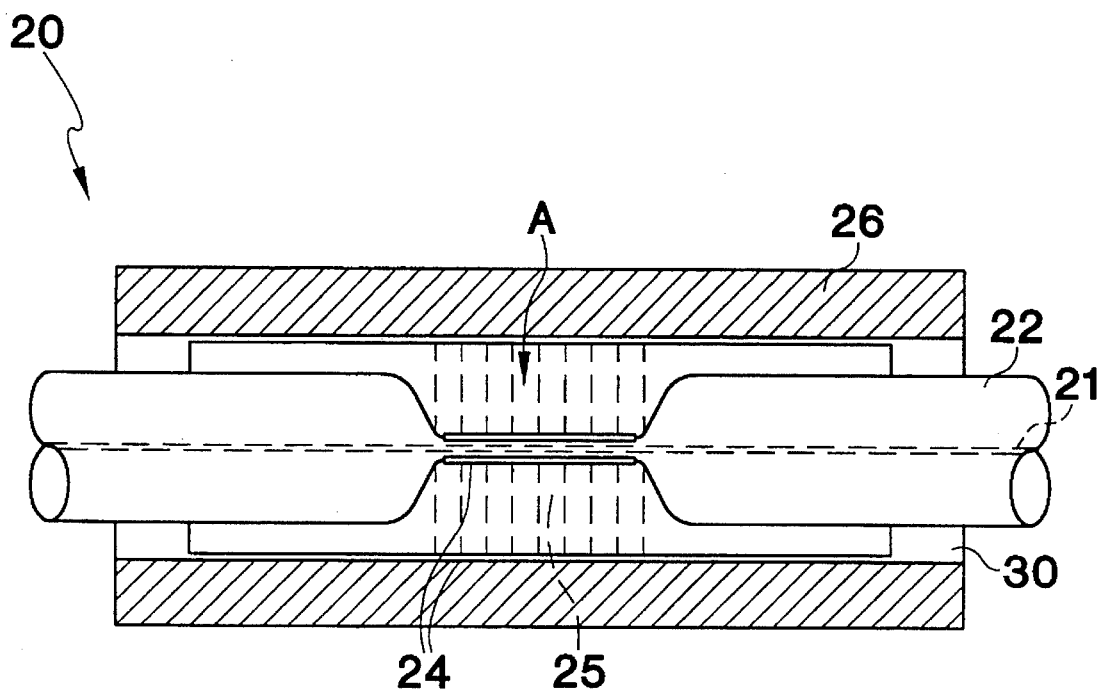
FIGS. 3a and 3b show respectively the side view and cross-sectional view of the structural configuration of the fiber-optic polarizer in accordance with a preferred embodiment of the present invention.
Figure 3B:
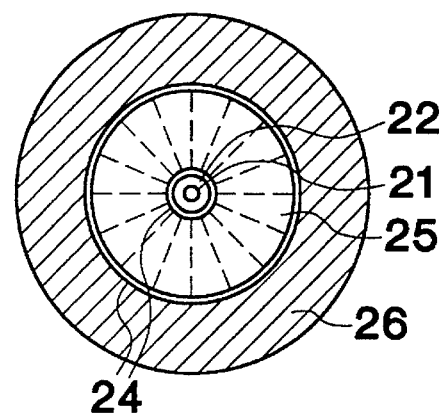

Refer to FIGS. 3a and 3b showing respectively, the side view and cross-sectional view of the structural configuration of a fiber-optic polarizer in accordance with a preferred embodiment of the present invention. As can be seen in the drawings, the fiber-optic polarizer of the present invention comprises a dual-mode optical fiber 20 having core 21 and cladding 22. The dual-mode optical fiber 20 supports transmission of $LP_{01}$ and $LP_{11}$ mode groups. It should be noted that the $LP_{01}$ mode group characterizes the $HE_{11}$ mode, while the $LP_{11}$ mode group includes $TE_{01}$, $TM_{01}$ and $HE_{21}$ modes. A portion of the cladding 22 along a selected length of the dual-mode optical fiber 20 is etched away to form a ring-shaped recession on the cladding 22, as shown in the side view of FIG. 3a and indicated generally by the reference character A. The etching of the cladding is controlled so that a layer of cladding 22 with a certain thickness is left still covering the core 21 of the fiber 20. In other words, the core 21 is not exposed.

The fiber-optic polarizer of the present invention further comprises a bulk volume of birefringent material, such as liquid crystal 25, symmetrically filled into the recessed area A described above. The molecular alignment of the liquid crystal material 25 and hence its optical axis is aligned to the radial direction of the optical fiber 20. The extraordinary refractive index of the liquid crystal 25 is selected to be larger than the refractive index of the core 21. The refractive index of the core 21 is further larger than that of the cladding 22, and the refractive index of the cladding 22 is further larger than the ordinary refractive index of the liquid crystal 25.

The fiber-optic polarizer of the present invention further comprises a capillary tube 26 for enclosing and supporting the optical fiber 20 and the volume of liquid crystal 25. The radial orientation of the liquid crystal molecules is obtained by capillary action after the stripped portion indicated by A is inserted into the capillary tube 26.

When a light beam with the LP mode groups mentioned above is passed through the optical fiber 20, the fiber-optic polarizer of the present invention is capable of coupling the energy of the polarization modes with the radial electric field component into the surrounding liquid crystal 25. This is because the corresponding refractive index of the radial electric field in liquid crystal 25 (the extraordinary index) is larger than that in the core 21, and thus the polarization modes with the radial electric field component will be coupled from the core 21 to the liquid crystal 25. On the other hand, for the polarization mode with only the azimuthal electric field component, since the corresponding refractive index of the azimuthal electric field in the liquid crystal 25 (the ordinary index) is smaller than that in the cladding 22, its energy may be maintained in the core without subjecting to any loss. It is therefore possible to filter the $TM_{01}$, $HE_{21}$ and $HE_{11}$ modes, which possess the radial electric field components, out of the light beam, while maintaining the $TE_{01}$ mode, which has only the azimuthal electric field component, in the fiber for polarized light transmission.

The fiber-optic polarizer of the present invention based on the general description above, is capable of selecting polarization modes in the azimuthal direction of the optical fiber. Details of the structural configuration, as well as the fabricating method of two preferred embodiments of the present invention, are described below.

Embodiment 1

Refer again to FIGS. 3a and 3b. The method of fabricating one preferred embodiment of the present invention is as follows:

Step 1

A dual-mode optical fiber 20 consisting of a central core 21 and surrounding cladding 22 is subjected to a process of controlled etching in a suitable solution, for example, a 48% concentration of hydrofluoric acid (HF) at a temperature of about 26° C. for a period of time, about 30 minutes. The portion of the optical fiber cladding subjected to etching is selected to have a length of about several centimeters. The etching process is controlled to leave a layer of about 1 to 5 gm of thickness of cladding 22 still covering the core 21. The partially-stripped portion of the cladding forms a recessed space (e.g., a ring-shaped space) generally indicated by reference character A.

Step 2

The exposed surface of the partially-stripped portion of the cladding 22 of the fiber 20, specifically in the recessed space A, is then coated with a layer of aligning agent 24 such as DMOAP (N, N-dimethyl-N-octadecyl-3-aminopropyltrimethoxysilyl chloride). The aligning agent is capable of achieving the homeotropical alignment of the liquid-crystal molecules on the boundary when the liquid crystal 25 is filled in the space A and surrounds the coating layer 24 that covers the stripped cladding 22.

Step 3

A capillary tube 26, having an internal diameter sufficient to receive the insertion of the optical fiber 20, is coated on its internal tube surface also with a layer of aligning agent 24 such as DMOAP.

Step 4

The optical fiber 20, together with its cladding partially-stripped portion A, is inserted into the capillary tube 26. Then birefringent liquid crystal 25 is sucked, in a capillary phenomena, into the ring-shaped space formed between the inner tube surface of the capillary tube 26 and the external surface of the optical fiber 20. Notably, the liquid crystal 25 fills the space A covering the portion of the cladding that is partially stripped and coated with DMOAP layer 24.

Step 5

The stripping and coating processed optical fiber 20 is inserted into the tube 26 to form an enclosed space. Suitable material such as epoxy resin 30 is utilized to seal both ends of the enclosed space to contain the liquid crystal 25 therein. The liquid crystal 25 contained in the enclosed space aligns its molecules in the radial direction. This is due to the presence of the DMOAP layers 24 coated both on the inner surface of the capillary tube and the surface of the stripped portion of the cladding 22 in the area of space A. The alignment of the liquid crystal molecules in the radial direction of the optical fiber 20 is clearly shown schematically in FIG. 3b.

As indicated previously, to allow the polarizer thus fabricated to obtain the ability of selecting polarization modes in the azimuthal direction of the optical fiber, the refractive indices of the liquid crystal 25 are selected appropriately. The extraordinary refractive index of the liquid crystal 25 is selected to be larger than the refractive index of the core 21, the refractive index of the core 21 is further larger than that of the cladding 22, and the refractive index of the cladding 22 is further larger than the ordinary refractive index of the liquid crystal 25.

Embodiment 2

Figure 4A:
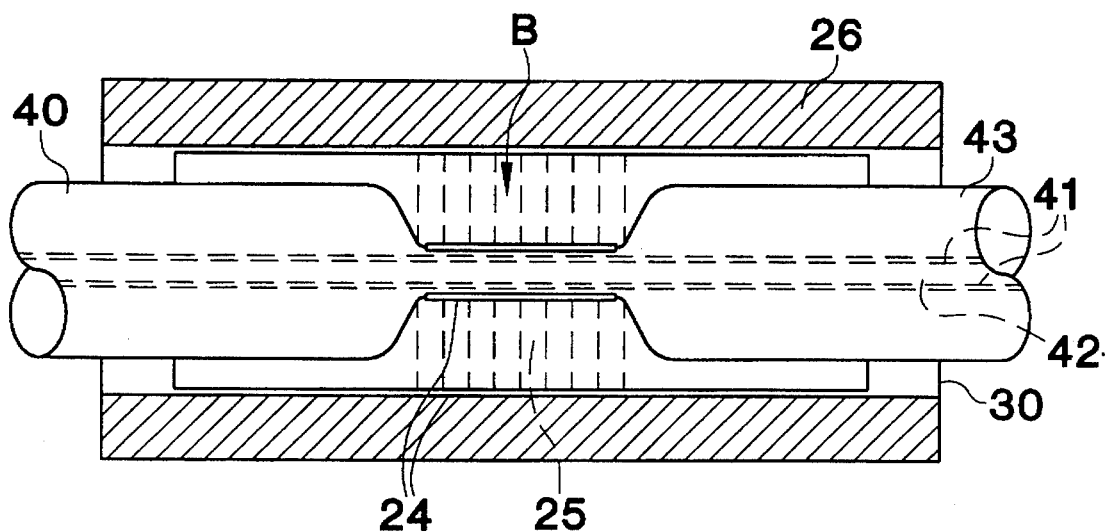
FIGS. 4a and 4b show respectively the side view and cross-sectional view of the structural configuration of the fiber-optic polarizer in accordance with another preferred embodiment of the present invention.
Figure 4B:
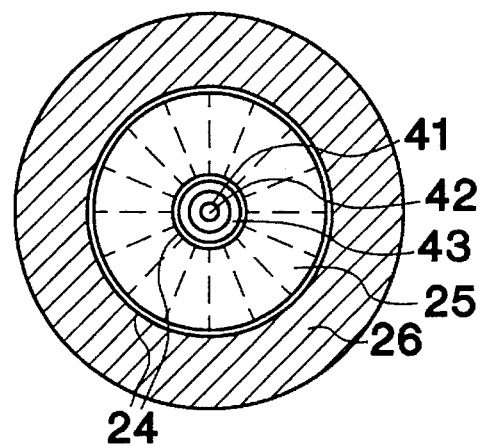

Refer to FIGS. 4a and 4b. The method of fabricating the other preferred embodiment of the present invention is described bellow. The general steps of fabrication are basically the same as that of the first embodiment described above, with the primary discrepancy being the use of a tubular optical fiber instead of the dual-mode optical fiber in the first embodiment:

Step 1

A tubular optical fiber 40 comprises three layers of concentric dielectric materials, including the inner-most "cladding" 42 in the shape of a cylindrical core, the tubular "core" 41 for light beam transmission that surrounds the inner "cladding" 42, and the outer-most cladding layer 43 sheathing the tubular "core" 41 from the outside. The tubular optical fiber 40 is selected to allow the transmission of the $TE_{01}$ and $TM_{01}$ modes only. Although the optical fiber used for fabricating the polarizer of the present invention is different from that of the previous embodiment, the formation of the recessed space as designated by B in FIG. 4a is generally the same. The tubular optical fiber 40 is subjected to a process of controlled etching in a suitable solution, and likewise leaves a layer of predetermined thickness of cladding 43 still covering the core 41.

Step 2

The exposed surface of the partially-stripped portion of the cladding 43 of the fiber 40 (i.e., the recessed space B) is then coated with a layer of aligning agent 24 such as DMOAP (N, N-dimethyl-N-octadecyl-3-aminopropyltrimethoxysilyl chloride). The aligning agent is capable of achieving the homeotropical alignment of the liquid-crystal molecules on the boundary when liquid crystal 25 is filled in the space B and surrounds the coating layer 24 that covers the stripped cladding 43.

Step 3

A capillary tube 26, having an internal diameter sufficient to receive the insertion of the tubular optical fiber 40, is coated on its internal tube surface also with the aligning agent 24.

Step 4

The tubular optical fiber 40, together with its cladding partially-stripped portion B, is inserted into the capillary tube 26. Then birefringent liquid crystal 25 is sucked, in a capillary phenomena, into the ring-shaped space formed between the inner tube surface of the capillary tube 26 and the external surface of the optical fiber 40.

Step 5

The stripping and coating processed optical fiber 20 is inserted into the tube 26 to form an enclosed space. Suitable material such as epoxy resin 30 is utilized to seal both ends of the enclosed space to contain the liquid crystal 25 therein. The liquid crystal 25 contained in the enclosed space aligns its molecules in the radial direction. This is due to the presence of the DMOAP layers 24 coated both on the inner surface of the capillary tube and the surface of the stripped portion of the cladding 43 in the area of space B. The alignment of the liquid crystal molecules in the radial direction of the tubular optical fiber 40 is clearly shown schematically in FIG. 4b.

Similarly, to allow the polarizer thus fabricated to obtain the ability of selecting polarization modes in the azimuthal direction of the optical fiber, the extraordinary refractive index of the liquid crystal 25 is selected to be larger than the refractive index of the "core" 41. The refractive index of the "core" 41 is larger than that of the cladding 43, and the refractive index of the cladding 43 is further larger than the ordinary refractive index of the liquid crystal 25.

As mentioned previously, the structural configuration and the method for fabrication of the two embodiments of the polarizer in accordance with the present invention, employ liquid crystal as the birefringent material. And the liquid crystal molecules are aligned in the radial direction of the optical fiber in order that the $TE_{01}$ mode of light transmission, having the electric field component in the azimuthal direction, is the only mode that can be selected by the polarizer of the present invention. It should be, however, pointed out and readily apparent to persons skilled in this art that this is only for the purpose of clarity in the description of the present invention. Apparently enough, if the liquid crystal molecules are aligned in the direction of the azimuthal direction of the optical fiber, the optical axes of the liquid crystal would then be aligned in the same direction and instead of the $TE_{01}$ mode, the $TM_{02}$ mode of the light transmission, having electric field component in the radial direction, would then be the only mode that can be selected by the polarizer.

Moreover, the birefringent material to be filled in the recessed space formed by the stripping of the cladding of the fiber can be any birefringent material other than liquid crystals if it exhibits suitable refractive indices. That is, it exhibits one of the refractive indices larger than the core index of the optical fiber and the other one smaller than the cladding index of the optical fiber.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for selecting waveguide modes in optical fibers, comprising:

an optical fiber having a core and a cladding sheathing said core, said optical fiber having a selected portion of said cladding removed and forming a recessed space in said cladding while preserving a predetermined thickness of said cladding remaining covering said core, said optical fiber being selected for allowing the transmission of light having a plurality of waveguide modes having radial and azimuthal electric field components, said recessed space being a recessed ring-shaped space; and a birefringent material filled in said recessed space, said birefringent material having first and second refractive indices wherein said first refractive index being larger than the refractive index of said core of said optical fiber, and said second refractive index being smaller than said refractive index of said cladding of said optical fiber;

wherein said first and second refractive indices of said birefringent material are arranged in the radial and azimuthal directions of said optical fiber respectively, said transmitted light of the waveguide mode having said radial electric field component being coupled out from said core of said optical fiber to said selective portion of said cladding, and said transmitted light of the waveguide mode having only said azimuthal electric field component remaining transmitted through said optical fiber.

2. The apparatus for selecting waveguide modes in optical fibers of claim 1, further characterized in that said first and second refractive indices of said birefringent material are arranged in the azimuthal and radial directions of said optical fiber respectively, said transmitted light of the waveguide mode having said azimuthal electric field component being coupled out from said core of said optical fiber to said selective portion of said cladding, and said transmitted light of the waveguide mode having only said radial electric field component remaining transmitted through said optical fiber.

3. The apparatus for selecting waveguide modes in optical fibers of claims 1 or 2, wherein said optical fiber is a dual-mode optical fiber having one dielectric layer sheathing another dielectric cylindrical core, and said dielectric cylindrical core having a refractive index being larger than the refractive index of said dielectric layer.

4. The apparatus for selecting waveguide modes in optical fibers of claims 1 or 2, wherein said optical fiber is a tubular optical fiber sequentially having of an inner dielectric layer, a dielectric cylindrical tube and an outer dielectric layer, and said dielectric cylindrical tube having a refractive index being larger than the refractive indices of said two dielectric layers.

5. The apparatus for selecting waveguide modes in optical fibers of claims 1 or 2, wherein said birefringent material is a liquid crystal material.

6. The apparatus for selecting waveguide modes in optical fibers of claims 1 or 2, wherein said selective portion is a symmetrical recessed ring-shaped space concentric to said optical fiber.

7. The apparatus for selecting waveguide modes in optical fibers of claims 1 or 2, wherein the length of said selected portion of said cladding being removed is several centimeters.

8. The apparatus for selecting waveguide modes in optical fibers of claims 1 or 2, wherein said predetermined thickness of said cladding preserved and remaining covering said core is in the range of 1 to 5 µm.

9. The apparatus for selecting waveguide modes in optical fibers of claim 6, further comprising a tube having an inner diameter sufficient to receive the insertion of said optical fiber and for providing support for said optical fiber therein and enclosing said recessed ring-shaped space.

10. The apparatus for selecting waveguide modes in optical fibers of claim 6, further comprising a capillary tube having an inner diameter sufficient to receive the insertion of said optical fiber and for providing support for said optical fiber therein and enclosing said recessed ring-shaped space.

11. A method for fabricating polarizer apparatus for selecting waveguide modes in optical fibers, comprising the steps of:
  (a) removing a selected portion of the cladding of an optical fiber for forming a recessed space in said cladding, the surface of said cladding after said selected portion is removed is near to said core of said optical fiber, the recessed space being a recessed ring-shaped space; and
  (b) enclosing a birefringent material in said recessed space of said optical fiber having said selected portion of said cladding being removed.

12. The method for fabricating polarizer apparatus for selection waveguide modes in optical fibers of claim 11, wherein said recessed ring-shaped space of the cladding of said optical fiber is formed by etching said cladding with hydrofluoric acid solution.

13. The method for fabricating polarizer apparatus for selection waveguide modes in optical fibers of claim 11, wherein said selected portion of said cladding being removed has a length of several centimeters.

14. The method for fabricating polarizer apparatus for selecting waveguide modes in optical fibers of claim 11, wherein said selected portion of said cladding being removed has left thereon a layer of said cladding with a thickness in the range of 1 to 5 µm.

15. The method for fabricating polarizer apparatus for selecting waveguide modes in optical fibers of claim 11, wherein said recessed ring-shaped space is a symmetrical ring-shaped space concentric to said optical fiber.

16. The method for fabricating polarizer apparatus for selecting waveguide modes in optical fibers of claim 11, wherein said birefringent material is a liquid crystal material.

17. The method for fabricating polarizer apparatus for selecting waveguide modes in optical fibers of claim 11, wherein said birefringent material filled in said recessed ring-shaped space having first and second refractive indices wherein said first refractive index being larger than the refractive index of said core of said optical fiber, and said second refractive index being smaller than the refractive index of the cladding of said optical fiber.

18. A method for fabricating polarizer apparatus for selecting waveguide modes in optical fibers, comprising the steps of:
  (a) removing a selected portion of the cladding of an optical fiber for forming a recessed space in said cladding, the surface of said cladding after said portion is removed is near to said core of said optical fiber;
  (b) inserting said optical fiber having said portion in the cladding removed into a cylindrical tube having an inner diameter sufficient to receive the insertion of said optical fiber and for providing support for said optical fiber therein and enclosing said recessed space; and
  (c) filling a birefringent material in said recessed space of said optical fiber being enclosed in said cylindrical tube.

19. The method for fabricating polarizer apparatus for selection waveguide modes in optical fibers of claim 18, wherein said recessed space is a recessed ring-shaped space.

20. The method for fabricating polarizer apparatus for selecting waveguide modes in optical fibers of claim 19, wherein said recessed ring-shaped space is a symmetrical ring-shaped space concentric to said optical fiber.

21. The method for fabricating polarizer apparatus for selecting waveguide modes in optical fibers of claims 18 or 19, wherein said cylindrical tube is a capillary tube.

22. The method for fabricating polarizer apparatus for selecting waveguide modes in optical fibers of claims 20 or 21, wherein said birefringent material is a liquid crystal material.

23. The method for fabricating polarizer apparatus for selecting waveguide modes in optical fibers of claim 22, further comprising a step before step (b) of coating aligning agent on the inner surface of said tube and on the surface of said cladding having said selected portion removed for aligning the molecular orientation of said liquid crystal material.

24. The method for fabricating polarizer apparatus for selecting waveguide modes in optical fibers of claim 23, wherein said aligning agent makes the molecular orientation of said liquid crystal material align in a homeotropical (perpendicular) direction.

25. The method for fabricating polarizer apparatus for selecting waveguide modes in optical fibers of claims 18 or 19, further comprising a step of sealing both ends of said tube for enclosing the capillary space formed between the surface of said optical fiber and the inner surface of said tube, said sealing further providing support to said optical fiber in said tube.

* * * * *